(12) United States Patent
Kump

(10) Patent No.: US 9,284,010 B2
(45) Date of Patent: Mar. 15, 2016

(54) INVERTED TUBE BIKE FRAME WITH BOTTLE OPENER GUSSET SYSTEMS

(71) Applicant: Scott Kump, Gilbert, AZ (US)

(72) Inventor: Scott Kump, Gilbert, AZ (US)

( * ) Notice: Subject to any disclaimer, the term of this patent is extended or adjusted under 35 U.S.C. 154(b) by 0 days.

(21) Appl. No.: 14/597,118

(22) Filed: Jan. 14, 2015

(65) Prior Publication Data

US 2015/0336627 A1 Nov. 26, 2015

Related U.S. Application Data

(60) Provisional application No. 62/001,528, filed on May 21, 2014.

(51) Int. Cl.
  *B62K 19/02* (2006.01)
  *B62K 19/18* (2006.01)
  *B62K 19/06* (2006.01)
(52) U.S. Cl.
  CPC ............... *B62K 19/02* (2013.01); *B62K 19/06* (2013.01); *B62K 19/18* (2013.01); *Y10T 29/49623* (2015.01)
(58) Field of Classification Search
  CPC .......... B62K 19/02; B62K 19/06; B62K 19/18
  USPC ................................................... 280/281.1
  See application file for complete search history.

(56) References Cited

U.S. PATENT DOCUMENTS

| 2,132,317 | A | 5/1936 | Pease | |
|---|---|---|---|---|
| 2,151,533 | A | 3/1938 | Schwinn | |
| D118,611 | S | 11/1939 | Alexander | |
| 4,941,674 | A * | 7/1990 | Trimble | B29C 70/342 264/258 |
| 5,826,898 | A * | 10/1998 | Fortier | B62K 19/32 280/276 |
| 8,585,070 | B2 | 11/2013 | Beale | |
| 2012/0061941 | A1 * | 3/2012 | Choi | B62K 3/02 280/281.1 |
| 2013/0062129 | A1 * | 3/2013 | Sunami | B62K 3/10 180/65.1 |

* cited by examiner

*Primary Examiner* — Tony Winner
*Assistant Examiner* — Marlon Arce
(74) *Attorney, Agent, or Firm* — Integrity Patent Group; Edwin Wold; Matthew Byer

(57) ABSTRACT

An inverted tube bike frame with bottle opener gusset system is a bicycle frame with the top tube and down tube having a heightened profile with concave sidewalls and a bottle opener gusset strengthening the joint between the seat tube and the top tube. The top tube has a downwardly curved design for added mechanical strength. Other tube-members of the frame have an elongated elliptical cross-section for increased strength and impact damage resistance. The wheel base is wider than that of a standard bicycle adding to forward movement stability and rider comfort. The design of the frame provides added strength and increased frame life with rugged service.

20 Claims, 8 Drawing Sheets

INVERTED TUBE BIKE FRAME WITH BOTTLE OPENER GUSSET SYSTEMS

CROSS-REFERENCE TO RELATED APPLICATION

The present application is related to and claims priority from prior provisional application Ser. No. 62/001,528, filed May 21, 2014 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of bicycles and more specifically relates to an inverted tube bike frame with bottle opener gusset system.

2. DESCRIPTION OF RELATED ART

Bicycles, or bikes, come in a variety of shapes and sizes and are designed and used for a variety of purposes. For example, bikes may be used for leisure activity, for exercise, for touring, for entertainment, for sport, for business, for cargo hauling, for commuting, for general transportation, etc. Typical bicycles are often classified as one or more of BMX, road, cyclocross, racing, track, touring, utility, commuter, mountain, off-road, downhill, time-trial, triathlon, cruiser, beach cruiser, etc.; however, such classifications, or types, of bicycles are certainly not exhaustive and a given bicycle may be used for a variety of purposes regardless of a so-called classification or type for which it is designated or designed to be used. Many bike frames may not provide longevity in use because of their weak design. Other frames may be durable, but are heavy and cumbersome. A solution that provides sufficient strength, durability, ease of manufacture and pleasant aesthetics is desirable.

Several attempts have been made to solve the above-mentioned problems such as those found in: U.S. Pat. No. 2,151,533 to Frank W. Schwinn; 2012/0061941 to Robert Choi and Barley A. Forsman; U.S. Pat. No. 2,132,317 to Earl E. Pease; U.S. Pat. No. 8,585,070 to Luke Beale; and D118,611 to John R. Alexander. This art is representative of bicycle frames. However, none of the above inventions and patents, taken either singly or in combination, is seen to describe the invention as claimed.

Preferably, a bicycle frame should provide increased frame strength for rugged service with reduced wind resistance, and yet, would operate reliably and be manufactured at a modest expense. Thus, a need exists for a reliable inverted tube bike frame with bottle opener gusset system to avoid the above-mentioned problems.

BRIEF SUMMARY OF THE INVENTION

In view of the foregoing disadvantages inherent in the known bicycle frame art, the present invention provides a novel inverted tube bike frame with bottle opener gusset. The general purpose of the present invention, which will be described subsequently in greater detail, is to provide a bike frame with key parts of the frame fabricated of inverted or concave sidewall tubing and comprising a bottle opener gusset to increase longevity in use.

The inverted tube bike frame with bottle opener gusset system preferably comprises a bike frame assembly having a top tube having an end A and an end B, a down tube having an end C and an end D, a head tube having a sidewall A, a seat tube having an end E and an end F, a bottom bracket housing, a seat-stay left having an end G and an end H and a seat-stay cap left, a seat-stay right having an end I and an end J and a seat-stay cap right, a chain-stay left having an end M and an end N and a chain-stay cap left, a chain-stay right having an end O and an end P and a chain-stay cap right, a rear dropout-left, a rear dropout-right, a seat-stay crossbar having an end K and an end L, a chain-stay crossbar, a kickstand mount, and a steering assembly.

The inverted tube bike frame with bottle opener gusset system comprises a bike frame assembly having a frame portion with a concave sidewall design that increases metal fatigue resistance against rugged use while being able to remain lightweight. The concave-tubular frame design may have a plurality of aerodynamic wind veins that are able to reduce wind resistance during forward motion of the bike. The top tube and the down tube each comprise at least two opposing concave sidewalls along the length of the top tube and the down tube forming a concave-tubular frame design with the top tube forming a substantially arcuate linear profile and the down tube substantially forming a vertical off-set. The top and bottom of the top tube and the down tube may have concave walls as well in some embodiments. The top tube and the down tube each comprise an extruded tube profile having pronounced vertical walls such that the height of the top tube and the height of the down tube are greater than the width of the top tube and the width of the down tube respectively. The pronounced vertical walls of the top tube and the down tube are each able to raise the area moment of inertia. The pronounced vertical walls of the top tube and the down tube are also able to exponentially increase the support strength and resistance to bending. The top tube of the bike frame assembly further comprises a positive arch that provides increased mechanical strength against bending and cracking of the bike frame assembly. End A of the top tube is non-removably attached to sidewall A of the head tube with an attachment angle between the top tube and the head tube comprising about a 20 degree rake angle. End B of the top tube is non-removably attached to the side wall of the seat tube near end E at about a 90 degree angle. End A and end B of the top tube each have a width of about half of the width of the middle portion of the top tube.

The bike frame assembly further comprises a bottle opener gusset that non-removably attaches a first edge of the bottle opener gusset to the underside of the top tube that is planate with end E, and attaches the perpendicular facing second edge of the bottle opener gusset to the seat tube adjacent to the underside of the top tube. The bottle opener gusset increases rigidity of the bike frame assembly and strengthens the bond between the top tube and the seat tube thereby reducing susceptibility to shock damage and metal fatigue failure. End C of the down tube is non-removably attached to sidewall A of the head tube below the attachment point of end A of the top tube such that the down tube and the top tube are vertically planar. End D of the down tube is perpendicularly and non-removably attached to the sidewall of the bottom bracket housing. The bottom bracket housing is a horizontally positioned cylindrical tube that holds the bearings for the crank of the pedal assembly. End F of the seat tube is non-removably attached to the sidewall of the bottom bracket housing at about a 90 degree angle to end D of the down tube.

End G of the seat-stay left is non-removably attached to the left side of the top tube near end B and comprises an off-set extending rearward and substantially parallel planar to the top tube. End H of the seat-stay left is attached to end N of the chain-stay left via the rear drop-out left, the chain-stay cap left, and the seat-stay cap left. End M of the chain-stay left is non-removably attached to the bottom bracket housing such that the seat-stay left, the chain-stay left, and the seat tube substantially form a triangular profile shape.

End I of the seat-stay right is non-removably attached to the right side of the top tube near end B and comprises an off-set extending rearward substantially and horizontally parallel planar to the top tube and horizontally parallel planar to the seat-stay left. End J of the seat-stay right is attached to end P of the chain-stay right via the rear drop-out right, the chain-stay cap right, and the seat-stay cap right. End O of the chain-stay right is non-removably attached to the bottom bracket housing such that the seat-stay right, the chain-stay right, and the seat tube substantially form a triangular profile shape. The bottom bracket housing comprises a connection point for end D, end F, end M, and end O of the down tube, the seat tube, the chain-stay left and the chain-stay right respectively. End L of the seat-stay crossbar is non-removably attached to the inner side of the seat-stay left and end K is non-removably attached to the inner side of the seat-stay right such that the seat-stay crossbar forms an upper spreader brace.

The kickstand mount is non-removably attached to the bottom side of the chain-stay left near end M and to the underside of the chain-stay right near end O. End Q of the chain-stay crossbar is non-removably attached to the inner side of the chain-stay left and end R is non-removably attached to the inner side of the chain-stay right such that the chain-stay crossbar forms a lower spreader brace. The chain-stay right, the chain-stay left, the seat-stay right, and the seat-stay left, each comprise an elongated elliptical cross-section that is able to substantially increase resistance to metal fatigue and frame failure.

The steering assembly is structured and arranged to pivotally couple to the head tube such that a fully assembled bike frame assembly is able to be steered during forward movement. The steering assembly comprises a fork-blade right and a fork-blade left that extend downward to attach to the front wheel via a front drop-out left and a front drop-out right respectively. The front drop-out left and a front drop-out right non-removable attach to the bottom end of the fork-blade left and the fork-blade right respectively. The front drop-out left and the front drop-out right are flat shaped plates that have a substantially downwardly arranged slot that couples to the axle of the front wheel.

Other advantages of the bike frame assembly preferably embody a greater distance between the front wheel axis and the rear wheel axis than a standard bicycle frame does, or a longer wheel base, which provides greater forward movement stability. The fork-blade right and the fork-blade left each have an elongated elliptical cross-section to resist bending from frontal impacts that are encountered in the more aggressive riding activities. The novel design features of the bike frame assembly with the concave-tubular frame design and elliptical cross-section of several of the frame members is useful for avoiding replacement of the frame in many cases by increasing resistance to stress induced cracks and bends of the bike frame assembly substantially increasing service life.

The inverted tube bike frame with bottle opener gusset system may have a kit that includes at least one fully assembled frame sub-subassembly, at least one fully assembled fork sub-assembly, at least two bicycle wheels, at least one bicycle chain, at least one pedal assembly, at least one set of wheel brakes with handlebar brake levers, at least one set of handle bars with vertically formed grips, at least one set of assembly instructions, and at least one owner's manual.

The various parts of the bicycle frame assembly may be attached together during manufacturing using various different methods. The term "attach" is intended to mean any one or any combination of the following methods that include welding, fusing, fastening, bolting, screwing, adhesively attaching, bonding, brazing, soldering, casting, extruding, pressing, threading, forging, riveting, and sintering.

A method of producing the inverted tube bike frame with bottle opener gusset system may comprise the steps of: extruding and forming a top tube and a down tube having concave walls; extruding and forming elliptical profile tubes for a fork-blade right and a fork-blade left, a chain-stay left and a chain-stay right, a seat-stay left and a seat stay right, a chain-stay crossbar, a seat-stay crossbar, a bottom bracket housing, and a fork crown and a steering tube; stamp-cutting a rear dropout-left, a rear dropout-right, a front dropout-left, a front dropout-right, a kickstand mount, and a bottle opener gusset; extruding and forming a head tube and a seat tube; attaching the top tube to the head tube and the seat tube; attaching the down tube to the head tube and to the bottom bracket housing, and attaching the bottom bracket housing to end F of the seat tube; attaching the seat-stay left and the seat stay right to the top tube and to the seat-stay crossbar; attaching the rear dropout-left and the rear dropout-right to the seat-stay left and the seat-stay right respectively; attaching the chain-stay left and the chain-stay right to the seat-stay left and the seat-stay right respectively and the chain-stay left and the chain-stay right to the bottom bracket housing; attaching the chain-stay crossbar to the chain-stay left and the chain-stay right; attaching the bottle opener gusset to the top tube and the seat tube to form the frame sub-assembly; attaching the fork-blade right and the fork-blade left to the fork crown and the steering tube to form the steering sub-assembly; and attaching the steering sub-assembly to the head tube of the frame sub-subassembly to complete the bike frame assembly.

The present invention holds significant improvements and serves as an inverted tube bike frame with bottle opener gusset. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, inverted tube bike frame with bottle opener gusset system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a bicycle frame and more particularly to an inverted tube bike frame with bottle opener gusset system as used to improve the frame strength for rugged service, reduced wind resistance, and extended service life.

Generally speaking, an inverted tube bike frame with bottle opener gusset system is a bicycle frame with the top tube and down tube having a heightened profile with concave sidewalls and a bottle opener gusset strengthening the joint between the seat tube and the top tube. The top tube has a downwardly curved design for added mechanical strength. Other tube-members of the frame have an elongated elliptical cross-section for increased strength and impact damage resistance. The wheel base is wider than that of a standard bicycle adding to forward movement stability and rider comfort. The design of the frame provides added strength and increased frame life with rugged service.

Figure 1:
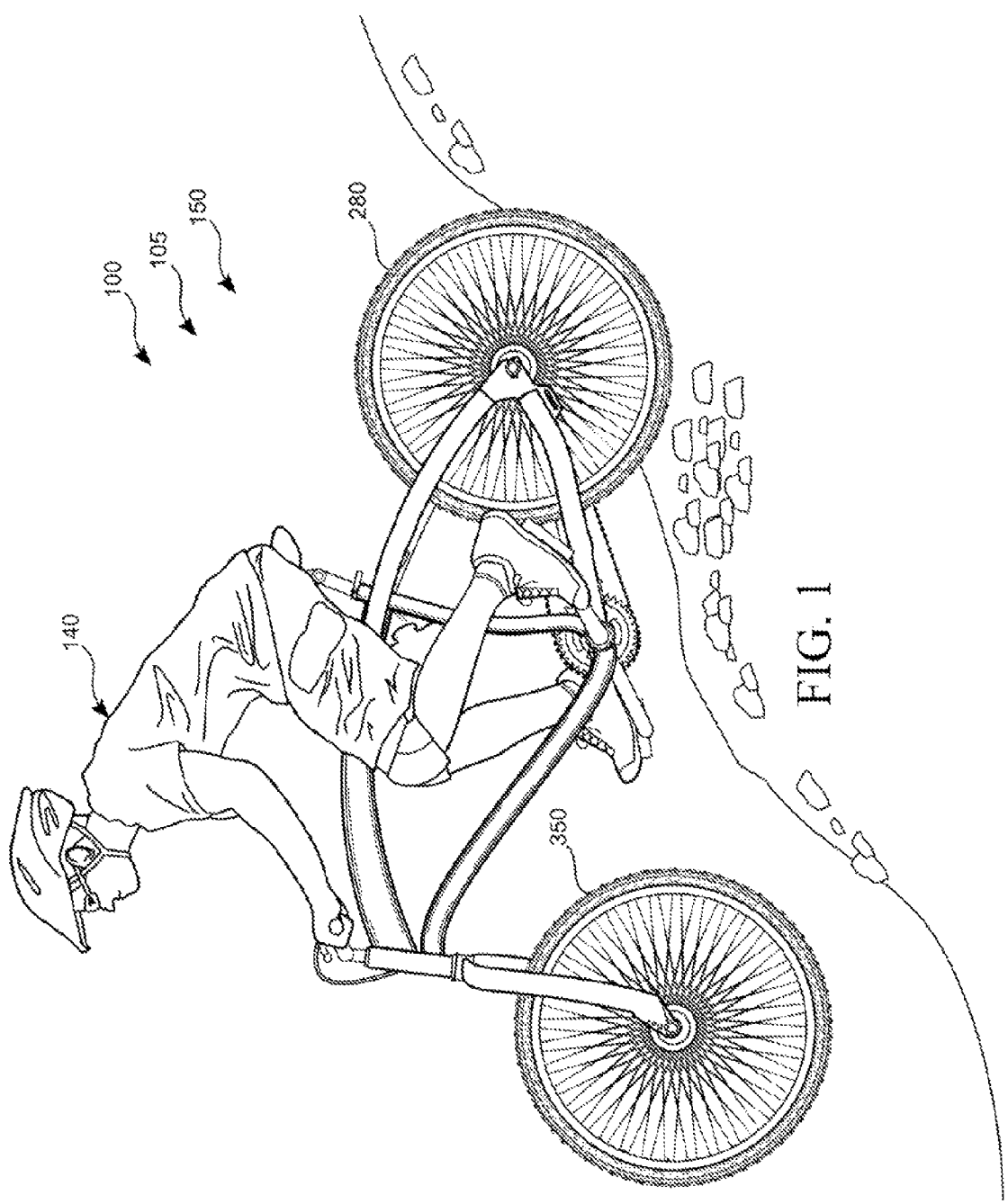
FIG. 1 shows a perspective view illustrating an in-use condition of an inverted tube bike frame with bottle opener gusset system according to an embodiment of the present invention.

Referring to the drawings by numerals of reference there is shown in FIG. 1, a perspective view illustrating 'in-use' condition 150 of inverted tube bike frame with bottle opener gusset system 100 according to an embodiment of the present invention.

Bike frame assembly 105 of the present invention has been designed with extended service life, comfort, and stability in mind for the types of rugged applications that would be found in off-road, racing, mountain biking, cyclocross, downhill, triathlon, and other such types of biking. Bike frame assembly 105 may be conveniently used in any type of bicycling but has the added advantage of having a strengthened bike frame assembly 105 that is able to resist metal stress, bending and cracking of the joints from the pounding that may be experienced on rugged trails and jumps because of a unique concave sidewall 200 frame design. Concave-tubular frame design 700 may also have a plurality of aerodynamic wind veins that are able to reduce wind resistance during forward motion of bike frame assembly 105 that would be useful in street racing or where endurance and speed are necessary. The lengthened bike frame assembly 105 adds to the vertical stability and comfort of higher speed bicycling as might be found in touring or street biking. Bike frame assembly 105 is not limited to one wheel base width and as such, may have different wheel base widths for different types of bicycles. For instance, a BMX bicycle may have a shorter bike frame assembly 105 while a street bicycle having bike frame assembly 105 of inverted tube bike frame with bottle opener gusset system 100 may have a longer bike frame assembly 105.

Figure 2:
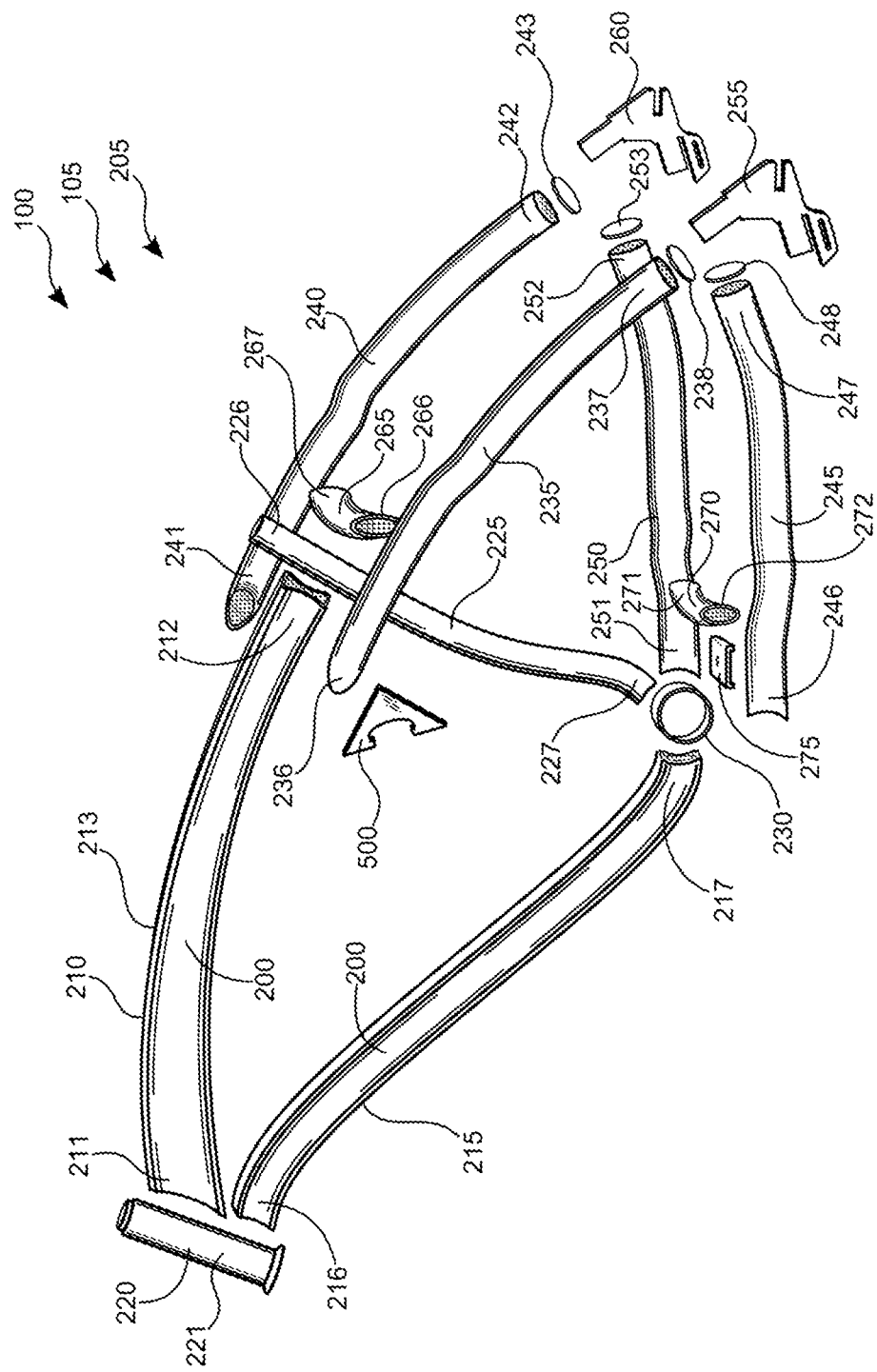
FIG. 2 is an exploded view illustrating a frame sub-assembly of the inverted tube bike frame with bottle opener gusset system according to an embodiment of the present invention of FIG. 1.

Referring now to FIG. 2, an exploded view illustrating frame sub-assembly 205 of inverted tube bike frame with bottle opener gusset system 100 according to an embodiment of the present invention of FIG. 1.

Inverted tube bike frame with bottle opener gusset system 100 preferably comprises bike frame assembly 105 having top tube 210 having end A 211 and end B 212, down tube 215 having end C 216 and end D 217, head tube 220 having sidewall A 221, seat tube 225 having end E 226 and end F 227, bottom bracket housing 230, seat-stay left 235 having end G 236 and end H 237 and seat-stay cap left 238, seat-stay right 240 having end I 241 and end J 242 and seat-stay cap right 243, chain-stay left 245 having end M 246 and end N 247 and chain-stay cap left 248, chain-stay right 250 having end O 251 and end P 252 and chain-stay cap right 253, rear dropout-left 255, rear dropout-right 260, seat-stay crossbar 265 having end K 266 and end L 267, chain-stay crossbar 270 having end Q 271 and end R 272, kickstand mount 275, and steering sub-assembly 300. End D 217 of down tube 215 is perpendicularly and non-removably attached to the sidewall of bottom bracket housing 230 which is a short horizontally positioned cylindrical tube. End F 227 of seat tube 225 is non-removably attached to the sidewall of bottom bracket housing 230 at about a 90 degree angle to end D 217 of down tube 215.

End G 236 of seat-stay left 235 is non-removably attached to the left side of top tube 210 near end B 212 and comprises an off-set extending substantially parallel planar to top tube 210. End H 237 of seat-stay left 235 is attached to end N 247 of chain-stay left 245 via rear dropout-left 255, chain-stay cap left 248, and seat-stay cap left 238. End M 246 of chain-stay left 245 is non-removably attached to bottom bracket housing 230 such that seat-stay left 235, chain-stay left 245, and seat tube 225 substantially form a triangular profile shape.

End O 251 of chain-stay right 250 is non-removably attached to bottom bracket housing 230 such that seat-stay right 240, chain-stay right 250, and seat tube 225 substantially form a triangular profile shape. Bottom bracket housing 230 comprises a connection point for end D 217, end F 227, end M 246, and end O 251 of down tube 215, seat tube 225, chain-stay left 245 and chain-stay right 250 respectively. End L 267 of seat-stay crossbar 265 is non-removably attached to the inner side of seat-stay left 235 and end K 266 is non-removably attached to the inner side of the seat-stay right 240 such that seat-stay crossbar 265 forms an upper spreader brace.

Figure 3:
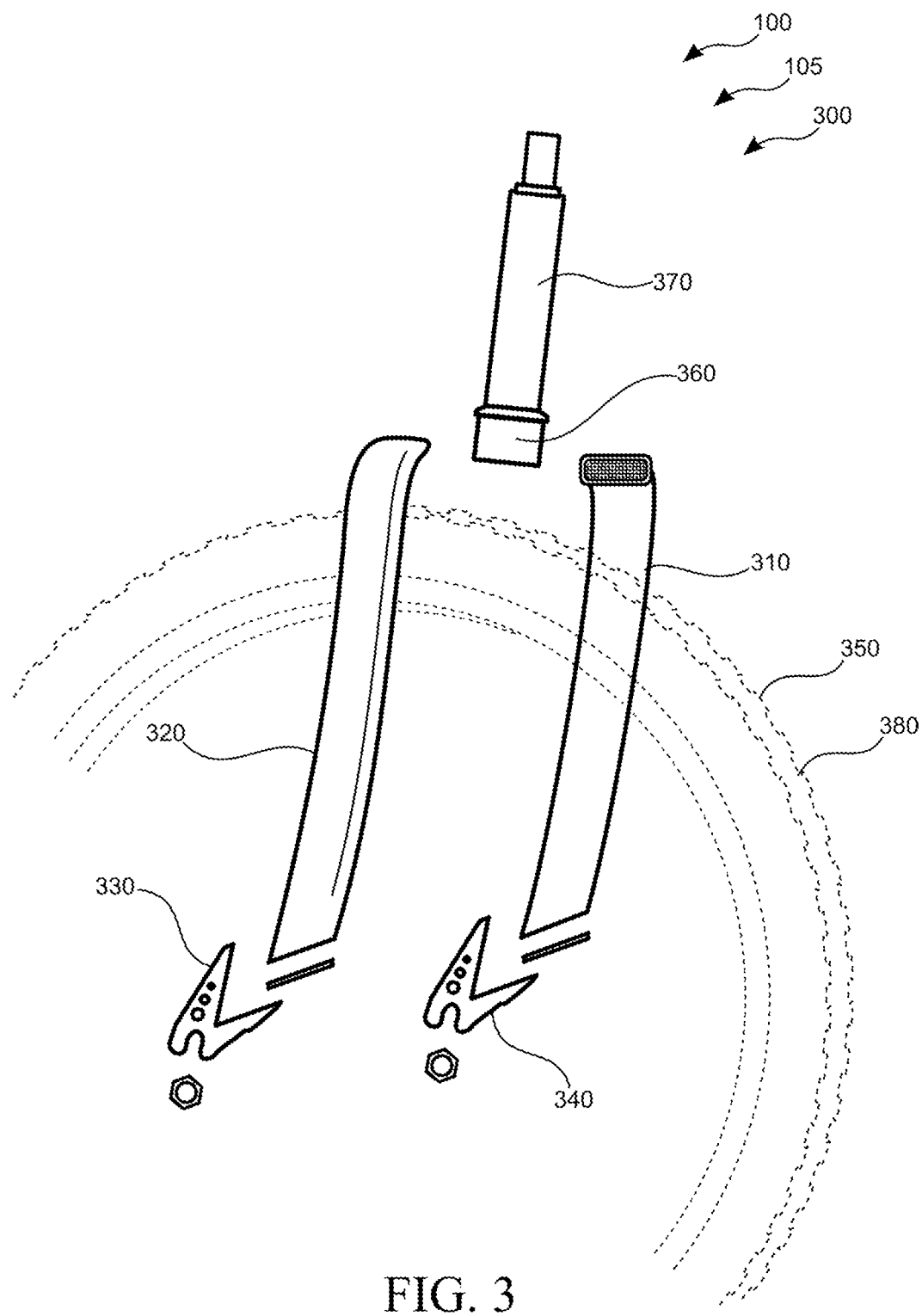
FIG. 3 is an exploded view illustrating a fork sub-assembly of the inverted tube bike frame with bottle opener gusset system according to an embodiment of the present invention of FIGS. 1-2.

Referring now to FIG. 3, an exploded view illustrating steering sub-assembly 300 of inverted tube bike frame with bottle opener gusset system 100 according to an embodiment of the present invention of FIGS. 1-2.

Steering sub-assembly 300 is structured and arranged to pivotally couple to head tube 220 such that a fully assembled bike frame assembly 105 is able to be steered during forward movement. Steering sub-assembly 300 further comprises fork-blade right 310 and fork-blade left 320. Fork-blade left 320 and fork-blade right 310 of steering sub-assembly 300 further comprise front drop-out left 330 and front drop-out right 340 respectively. Front drop-out left 330 and front drop-out right 340 are structured and arranged such that front bicycle wheel 350 is able to be rotatably coupled thereto, and rear dropout-left 255 and rear dropout-right 260 is structured and arranged such that rear bicycle wheel 280 is able to be rotatably coupled thereto. Fork-blade right 310 and fork-blade left 320 are attached to fork crown 360 and fork crown 360 is attached to steering tube 370 to form steering sub-assembly 300.

Figure 4:
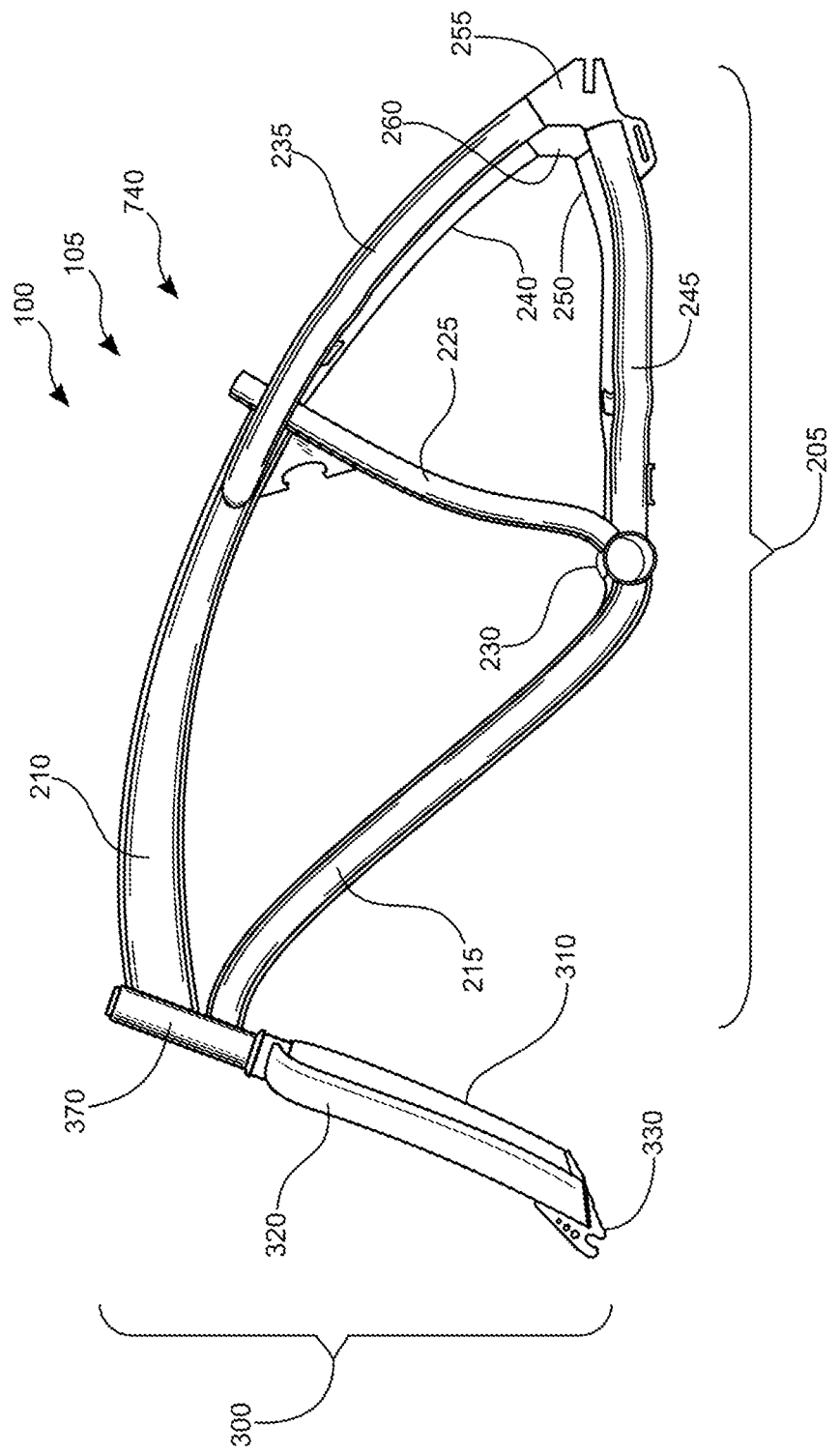
FIG. 4 is a left side view illustrating a fully assembled inverted tube bike frame with bottle opener gusset system according to an embodiment of the present invention of FIGS. 1-3.

Referring now to FIG. 4, a left side view illustrating a fully assembled inverted tube bike frame with bottle opener gusset system 100 according to an embodiment of the present invention of FIGS. 1-3.

Top tube 210 and down tube 215 each comprise at least two opposing concave sidewalls 200 along the length of top tube 210 and along the length of down tube 215 forming concave-tubular frame design 700 with top tube 210 forming a substantially arcuate linear profile and down tube 215 substantially forming about a 50 degree vertical off-set. Top tube 210 and down tube 215 each comprise an extruded tube profile having pronounced vertical walls such that the height of top tube 210 and the height of down tube 215 are greater than the width of top tube 210 and the width of down tube 215 respectively. The pronounced vertical walls of top tube 210 and down tube 215 are each able to raise the area moment of inertia. The pronounced vertical walls of top tube 210 and down tube 215 are also able to exponentially increase the support strength and resistance to bending of the tubes from impacts and rugged use. In addition, top tube 210 of bike frame assembly 105 further comprises a positive arch that provides increased mechanical strength against bending and cracking of bike frame assembly 105.

End A 211 of top tube 210 is non-removably attached to sidewall A 221 of head tube 220, with the attachment angle between top tube 210 and head tube 220 comprising about a 20 degree rake angle. End B 212 of top tube 210 is non-removably attached to the side wall of seat tube 225 near end E 226 at about a 90 degree angle. Bike frame assembly 105 further has a wider than standard wheel base for greater stability during forward movement.

Figure 5:
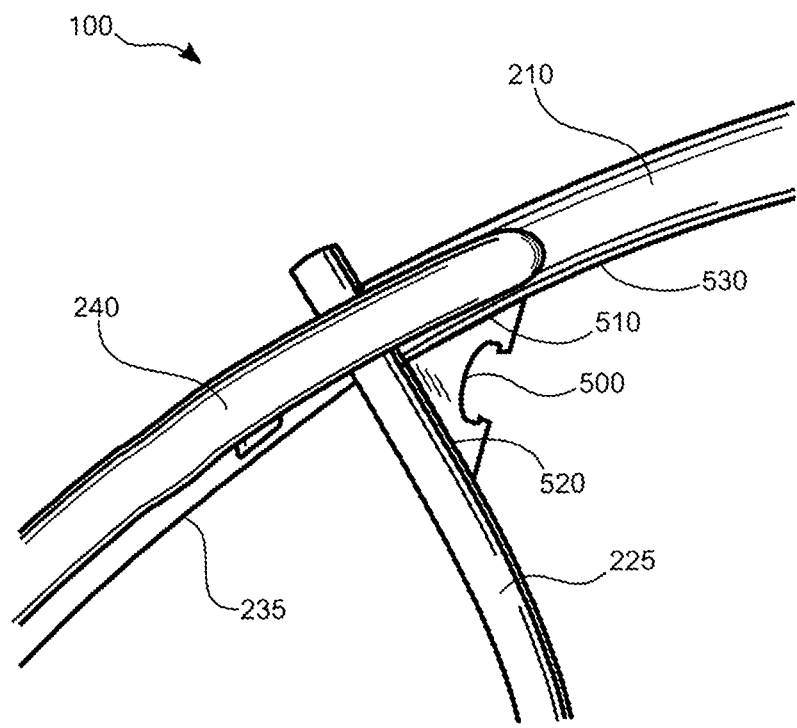
FIG. 5 is a right side perspective view illustrating an installed bottle opener gusset of the inverted tube bike frame with bottle opener gusset system according to an embodiment of the present invention of FIGS. 1-4.

Referring now to FIG. 5, a right side perspective view illustrating bottle opener gusset 500 of inverted tube bike frame with bottle opener gusset system 100 according to an embodiment of the present invention of FIGS. 1-4.

Bike frame assembly 105 comprises bottle opener gusset 500 that non-removably attaches first edge 510 of bottle opener gusset 500 to the underside of top tube 210 that is planate with end E 226, and attaches the perpendicular facing second edge 520 of bottle opener gusset 500 to seat tube 225 adjacent to underside 530 of top tube 210. Bottle opener gusset 500 increases the rigidity of bike frame assembly 105 and strengthens the bond between top tube 210 and seat tube 225 thereby reducing susceptibility to shock damage and metal fatigue failure. A second functionality of bottle opener gusset 500 is to remove the caps from beverage bottles. End C 216 of down tube 215 is non-removably attached to sidewall A 221 of head tube 220 below the attachment point of end A 211 of top tube 210 such that down tube 215 and top tube 210 are vertically planar as may be seen in the following FIG. 6.

Figure 6:
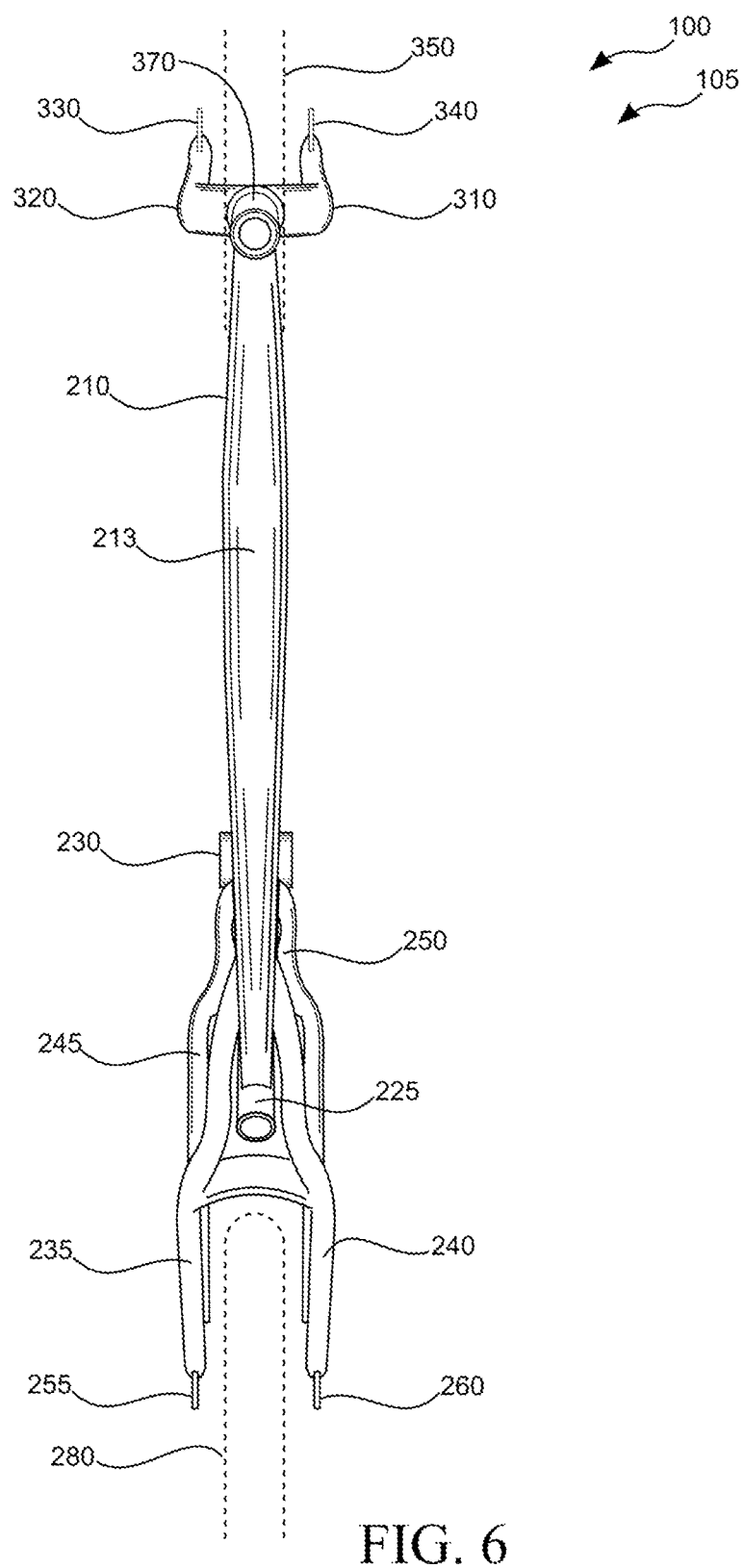
FIG. 6 is an overhead view illustrating the inverted tube bike frame with bottle opener gusset system according to an embodiment of the present invention of FIGS. 1-5.

Referring now to FIG. 6, an overhead view illustrating inverted tube bike frame with bottle opener gusset system 100 according to an embodiment of the present invention of FIGS. 1-5.

End I 241 of seat-stay right 240 is non-removably attached to the right side of top tube 210 near end B 212 and comprises an off-set extending substantially horizontally parallel planar to top tube 210 and horizontally parallel planar to seat-stay left 235. End J 242 of seat-stay right 240 is attached to end P 252 of chain-stay right 250 via rear dropout-right 260, chain-stay cap right 253, and seat-stay cap right 243. End A 211 and end B 212 of top tube 210 have a width of about half of the width of middle portion 213 of top tube 210. Seat-stay left 235 and seat-stay right 240, and chain-stay left 245 and chain-stay right 250 each comprise an offset having at least two bends such that end G 236 and end I 241 of seat-stay left 235 and seat-stay right 240 are closer to each other than end H 237 and end J 242 of the same tubes. In like manner, end M 246 and end O 251 of chain-stay left 245 and chain-stay right 250 are closer to each other than end N 247 and end P 252 as can be seen in the overhead view. This allows seat-stay left 235 and seat-stay right 240 to be attached to top tube 210 at one end and chain-stay left 245 and chain-stay right 250 to be attached to bottom bracket housing 230 while ends H 237, J 242, N 247, and P 252 are spaced wide enough for rear bicycle wheel 280 and brake.

Figure 7:
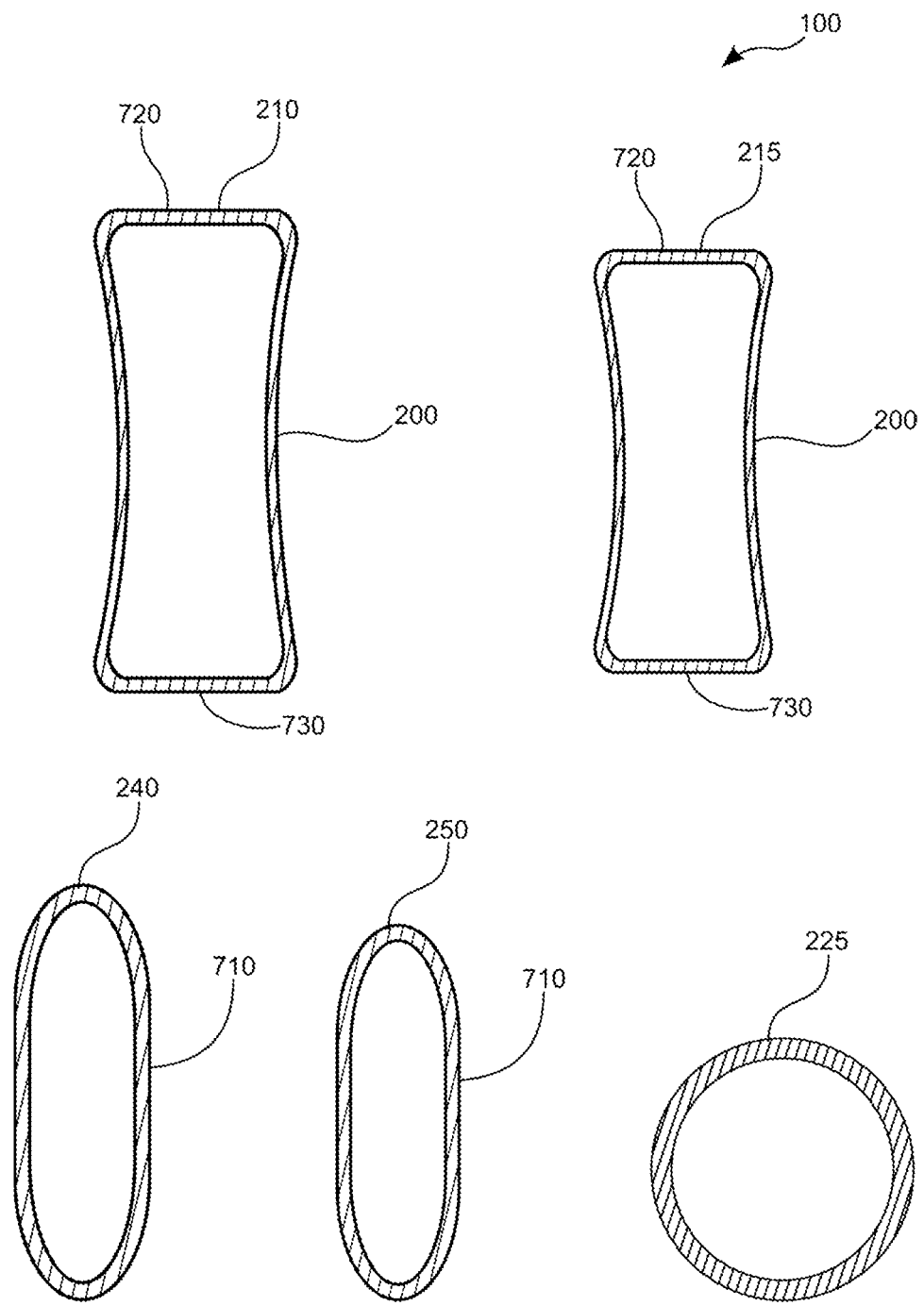
FIG. 7 is a cross-sectional view illustrating a top tube, a down tube, a seat-stay right, a chain-stay right, and a seat tube of the inverted tube bike frame with bottle opener gusset system according to an embodiment of the present invention of FIGS. 1-6.

Referring now to FIG. 7, is a cross-sectional view of top tube 210, down tube 215, seat-stay right 240, chain-stay right 250, and seat tube 225 illustrating inverted tube bike frame with bottle opener gusset system 100 according to an embodiment of the present invention of FIGS. 1-6.

Bike frame assembly 105 with concave-tubular frame design 700 has a stronger geometrical design than most frame designs and is useful for increasing resistance to stress induced cracks and bends of bike frame assembly 105 and providing longer service life. Similarly, fork-blade right 310 and fork-blade left 320 each have elongated elliptical cross-sections 710 to resist bending from a frontal impact. Chain-stay right 250, chain-stay left 245, seat-stay right 240, and seat-stay left 235, each also comprise elongated elliptical cross-sections 710 that is able to substantially increase resistance to metal fatigue and failure. Top tube 210 and down tube 215 as shown in this figure each have concave sidewalls 200 with a flat top wall 720 and flat bottom wall 730, however, an alternate embodiment of these tubes has four concave sidewalls 200 with the height of the concave sidewalls 200 having a higher profile than the width of top wall 720 and bottom wall 730.

Inverted tube bike frame with bottle opener gusset system 100 may be sold as kit 740 comprising the following parts: at least one fully assembled frame sub-assembly 205; at least one fully assembled steering sub-assembly 300; at least two bicycle wheels 380; at least one bicycle chain; at least one pedal assembly; at least one set of wheel brakes with handle-bar brake levers; at least one set of handle bars with vertically formed grips; at least one set of assembly instructions; and at least one owner's manual. The kit has instructions such that functional relationships are detailed in relation to the structure of the invention (such that the invention can be used, maintained, or the like in a preferred manner). Inverted tube bike frame with bottle opener gusset system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 8:
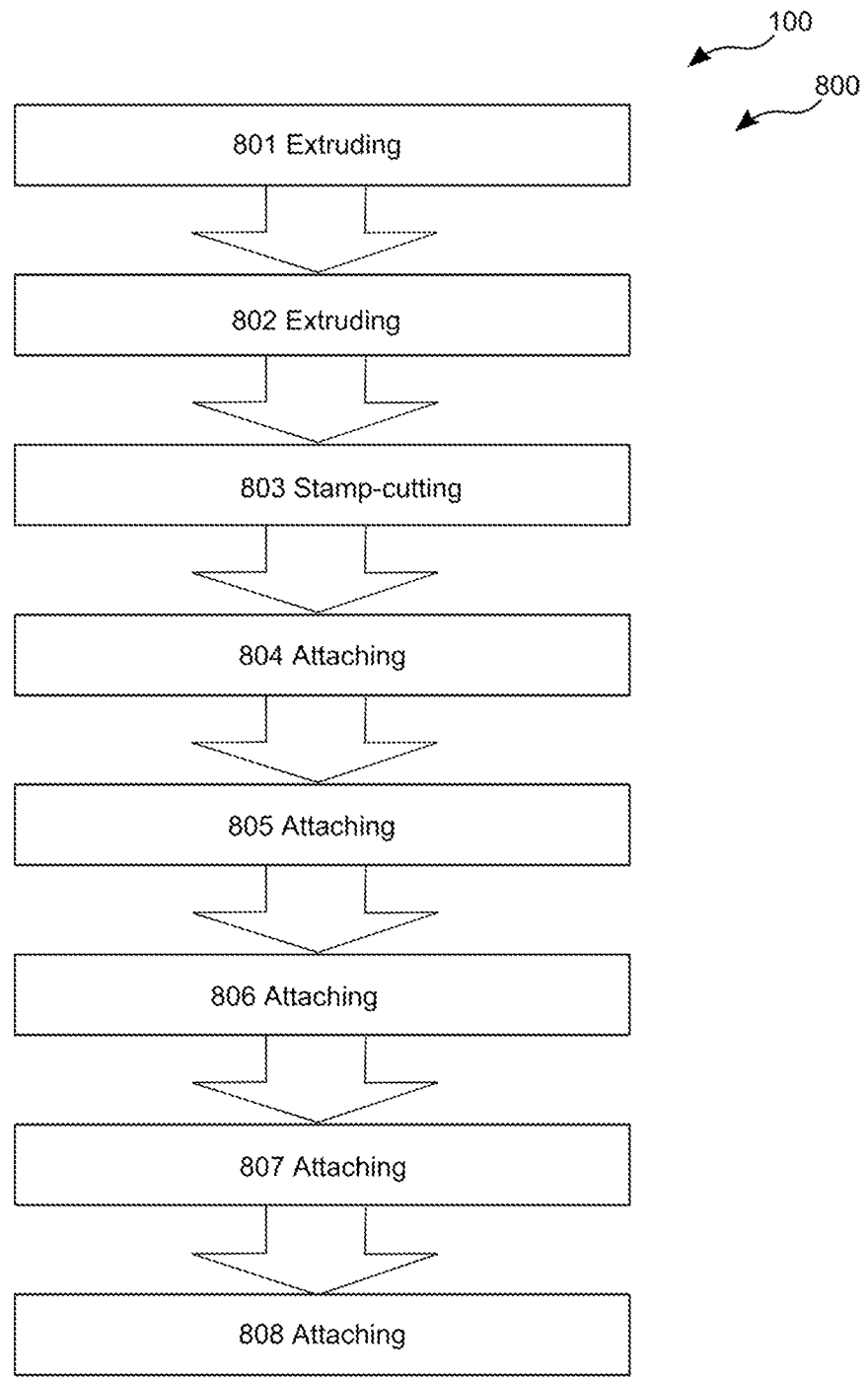
FIG. 8 is a flowchart illustrating a method of use for the inverted tube bike frame with bottle opener gusset system according to an embodiment of the present invention of FIGS. 1-7.

Referring now to FIG. 8 showing flowchart 850 illustrating method of use 800 for inverted tube bike frame with bottle opener gusset system 100 according to an embodiment of the present invention of FIGS. 1-7.

The various parts of bike frame assembly 105 may be attached together during manufacturing using various different methods. The term "attach" is intended to mean any one or any combination of the following methods that include welding, fusing, fastening, bolting, screwing, adhesively attaching, bonding, brazing, soldering, casting, extruding, pressing, threading, forging, riveting, and sintering.

As shown, method of producing 800 may comprise the steps of: step one 801 extruding and forming top tube 210 and down tube 215 having concave sidewalls 200; step two 802 extruding and forming elliptical profile tubes for fork-blade right 310 and fork-blade left 320, chain-stay left 245 and chain-stay right 250, seat-stay left 235 and seat-stay right 240, chain-stay crossbar 270, seat-stay crossbar 265, bottom bracket housing 230, fork crown 360 and steering tube 370; step three 803 stamp-cutting rear dropout-left 255, rear dropout-right 260, front drop-out left 330, front drop-out right 340, kickstand mount 275, and bottle opener gusset 500; extruding and forming head tube 220 and seat tube 225; attaching top tube 210 to head tube 220 and seat tube 225; step four 804 attaching down tube 215 to head tube 220 and to bottom bracket housing 230, and attaching bottom bracket housing 230 to end F 227 of seat tube 225; attaching seat-stay left 235 and seat-stay right 240 to top tube 210 and to seat-stay crossbar 265; attaching rear dropout-left 255 and rear dropout-right 260 to seat-stay left 235 and seat-stay right 240 respectively; step five 805 attaching chain-stay left 245 and seat-stay right 240 to seat-stay left 235 and seat-stay right 240 respectively and chain-stay left 245 and chain-stay right 250 to bottom bracket housing 230; step six 806 attaching chain-stay crossbar 270 to chain-stay left 245 and chain-stay right 250; step seven 807 attaching bottle opener gusset 500 to top tube 210 and seat tube 225 to form frame sub-assembly 205; step eight 808 attaching fork-blade right 310 and fork-blade left 320 to fork crown 360 and steering tube 370 to form steering sub-assembly 300; and attaching steering sub-assembly 300 to head tube 220 of frame sub-assembly 205 to complete bike frame assembly 105.

It should be noted that the steps listed above may be implemented in different orders depending on manufacturing costs, tooling availability, advancements in technology, etc. and as such, may not be implemented in the order listed in method of production 800 in all cases. Additional and optional steps of method 800 may be added or subtracted in certain circumstances.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An inverted tube bike frame with bottle opener gusset system comprising:
   a bike frame assembly having;
      at least one top tube having end A and end B;
      at least one down tube having end C and end D;
      at least one head tube having a sidewall A;
      at least one seat tube having end E and end F;
      at least one bottom bracket housing;
      at least one seat-stay left having end G and end H; and
         at least one seat-stay cap left;
      at least one seat-stay right having end I and end J; and
         at least one seat-stay cap right;
      at least one chain-stay left having end M and end N; and
         at least one chain-stay cap left;
      at least one chain-stay right having end O and end P; and
         at least one chain-stay cap right;
      at least one rear dropout-left;
      at least one rear dropout-right;
      at least one seat-stay crossbar having end K and end L;
      at least one chain-stay crossbar;
      at least one kickstand mount; and
      a steering assembly;
   wherein said inverted tube bike frame with bottle opener gusset system comprises said bike frame assembly;
   wherein said bike frame assembly comprises a frame portion having a concave sidewall design such that said bike frame assembly has an increased metal fatigue resistance;
   wherein said at least one top tube and said at least one down tube each comprise at least two opposing concave sidewalls along a length of said at least one top tube and said at least one down tube forming a concave-tubular frame design with said at least one top tube forming a substantially arcuate linear profile and said at least one down tube substantially forming a vertical off-set;
   wherein said end A of said at least one top tube is non-removably attached to said sidewall A of said at least one head tube, an attachment angle between said at least one top tube and said at least one head tube comprising about a 20 degree rake angle;
   wherein said end B of said at least one top tube is non-removably attached to a side wall of said at least one seat tube near end E at about a 90 degree angle;
   wherein said end C of said at least one down tube is non-removably attached to said sidewall A of said at least one head tube below an attachment point of said end A of said at least one top tube such that said at least one down tube and said at least one top tube are vertically planar;
   wherein said end D of said at least one down tube is perpendicularly and non-removably attached to a sidewall of said at least one bottom bracket housing, said at least one bottom bracket housing comprising a horizontally positioned cylindrical tube;

wherein said end F of said at least one seat tube is non-removably attached to said sidewall of said at least one bottom bracket housing at about a 90 degree angle to said end D of said at least one down tube;

wherein said end G of said at least one seat-stay left is non-removably attached to a left side of said at least one top tube near said end B and comprises an off-set extending substantially parallel planar to said at least one top tube;

wherein said end H of said at least one seat-stay left is attached to said end N of said at least one chain-stay left via said at least one rear drop-out left, said at least one chain-stay cap left, and said at least one seat-stay cap left;

wherein said end M of said at least one chain-stay left is non-removably attached to said at least one bottom bracket housing such that said at least one seat-stay left, said at least one chain-stay left, and said at least one seat tube substantially form a triangular profile shape;

wherein said end I of said at least one seat-stay right is non-removably attached to a right side of said at least one top tube near said end B and comprises an off-set extending substantially and horizontally parallel planar to said at least one top tube and horizontally parallel planar to said seat-stay left;

wherein said end J of said at least one seat-stay right is attached to said end P of said at least one chain-stay right via said at least one rear drop-out right, said at least one chain-stay cap right, and said at least one seat-stay cap right;

wherein said end O of said at least one chain-stay right is non-removably attached to said at least one bottom bracket housing such that said at least one seat-stay right, said at least one chain-stay right, and said at least one seat tube substantially form a triangular profile shape;

wherein said end L of said at least one seat-stay crossbar is non-removably attached to an inner side of said at least one seat-stay left and said end K is non-removably attached to an inner side of said at least one seat-stay right such that said at least one seat-stay crossbar forms an upper spreader brace;

wherein said at least one kickstand mount is non-removably attached to a bottom side of said at least one chain-stay left near said end M and to an underside of said at least one chain-stay right near said end O;

wherein said end Q of said at least one chain-stay crossbar is non-removably attached to an inner side of said at least one chain-stay left and said end R is non-removably attached to an inner side of said at least one chain-stay right such that said at least one chain-stay crossbar forms a lower spreader brace;

wherein said steering assembly is structured and arranged to pivotally couple to said at least one head tube such that a fully assembled said bike frame assembly is able to be steered during a forward movement; and wherein said bike frame assembly having said concave-tubular frame design is useful for increasing a stress induced crack resistance and a bend resistance of said bike frame assembly for a longer service life of said bike frame assembly.

2. The inverted tube bike frame with bottle opener gusset system of claim 1 wherein said bike frame assembly comprises a bottle opener gusset that non-removably attaches a first edge of said bottle opener gusset to an underside of said at least one top tube that is planate with said end E, and attaches a perpendicular facing second edge of said bottle opener gusset to said at least one seat tube adjacent to said underside of said at least one top tube.

3. The inverted tube bike frame with bottle opener gusset system of claim 2 wherein said bottle opener gusset increases a rigidity of said bike frame assembly.

4. The inverted tube bike frame with bottle opener gusset system of claim 3 wherein said bottle opener gusset further strengthens a bond between said at least one top tube and said at least one seat tube thereby reducing susceptibility to a shock damage and to a metal fatigue failure.

5. The inverted tube bike frame with bottle opener gusset system of claim 1 wherein said concave-tubular frame design comprises a plurality of aerodynamic wind veins for reducing wind resistance during a forward motion of said bike frame assembly.

6. The inverted tube bike frame with bottle opener gusset system of claim 1 wherein said steering assembly further comprises a fork-blade right and a fork-blade left.

7. The inverted tube bike frame with bottle opener gusset system of claim 6 wherein said fork-blade right and said fork-blade left each comprise an elongated elliptical cross-section to resist bending from a frontal impact.

8. The inverted tube bike frame with bottle opener gusset system of claim 1 wherein said at least one top tube and said at least one down tube each comprise an extruded tube profile having pronounced vertical walls such that a height of said at least one top tube and a height of said at least one down tube is greater than a width of said at least one top tube and a width of said at least one down tube respectively.

9. The inverted tube bike frame with bottle opener gusset system of claim 8 wherein said pronounced vertical walls of said at least one top tube and said at least one down tube are each able to raise an area moment of inertia of said at least one top tube and said at least one down tube.

10. The inverted tube bike frame with bottle opener gusset system of claim 9 wherein said pronounced vertical walls of said at least one top tube and said at least one down tube are able to exponentially increase a support strength of a resistance to said bending.

11. The inverted tube bike frame with bottle opener gusset system of claim 1 wherein said at least one top tube of said bike frame assembly further comprises a positive arch, said positive arch providing increased mechanical strength against said bending and a cracking of said bike frame assembly.

12. The inverted tube bike frame with bottle opener gusset system of claim 1 wherein said at least one bottom bracket housing comprises a connection point for said end D, said end F, said end M, and said end O of said at least one down tube, said at least one seat tube, said at least one chain-stay left and said at least one chain-stay right respectively.

13. The inverted tube bike frame with bottle opener gusset system of claim 1 wherein said fork-blade left and said fork-blade right of said steering assembly further comprise a front drop-out left and a front drop-out right respectively.

14. The inverted tube bike frame with bottle opener gusset system of claim 13 wherein said front drop-out left and said front drop-out right are structured and arranged such that a front bicycle wheel is able to be rotatably coupled thereto, and said rear drop-out left and said rear drop-out right is structured and arranged such that a rear bicycle wheel is able to be rotatably coupled thereto.

15. The inverted tube bike frame with bottle opener gusset system of claim 4 wherein said bike frame assembly further comprises a greater distance between a front wheel axis and a rear wheel axis than a standard bicycle frame providing a greater forward movement stability.

16. The inverted tube bike frame with bottle opener gusset system of claim 1 wherein said at least one chain-stay right and said at least one chain-stay left and said at least one seat-stay right and said at least one seat-stay left each comprise an elongated elliptical cross-section that is able to substantially increase a resistance to said metal fatigue and a frame failure.

17. The inverted tube bike frame with bottle opener gusset system of claim 1 wherein said end A and said end B of said at least one top tube have a width about half of said width of a middle portion of said at least one top tube.

18. An inverted tube bike frame with bottle opener gusset system comprising:
   a bike frame assembly having;
      at least one top tube having end A and end B;
      at least one down tube having end C and end D;
      at least one head tube having a sidewall A;
      at least one seat tube having end E and end F;
      at least one bottom bracket housing;
      at least one seat-stay left having end G and end H; and
         at least one seat-stay cap left;
      at least one seat-stay right having end I and end J; and
         at least one seat-stay cap right;
      at least one chain-stay left having end M and end N; and
         at least one chain-stay cap left;
      at least one chain-stay right having end O and end P; and
         at least one chain-stay cap right;
      at least one rear dropout-left;
      at least one rear dropout-right;
      at least one seat-stay crossbar having end K and end L;
      at least one chain-stay crossbar;
      at least one kickstand mount; and
      a steering sub-assembly;
   wherein said inverted tube bike frame with bottle opener gusset system comprises said bike frame assembly, said bike frame assembly comprising a frame sub-assembly and said steering sub-assembly;
   wherein said bike frame assembly comprises a frame portion having a concave sidewall design such that said bike frame assembly has an increased metal fatigue resistance;
   wherein said concave-tubular frame design comprises a plurality of aerodynamic wind veins that are able to reduce wind resistance during a forward motion of said bike frame assembly;
   wherein said at least one top tube and said at least one down tube each comprise at least two opposing concave sidewalls along a length of said at least one top tube and said at least one down tube forming a concave-tubular frame design with said at least one top tube forming a substantially arcuate linear profile and said at least one down tube substantially forming a vertical off-set;
   wherein said at least one top tube and said at least one down tube each comprise an extruded tube profile having pronounced vertical walls such that a height of said at least one top tube and a height of said at least one down tube is greater than a width of said at least one top tube and a width of said at least one down tube respectively;
   wherein said pronounced vertical walls of said at least one top tube and said at least one down tube are each able to raise an area moment of inertia of said at least one top tube and said at least one down tube;
   wherein said pronounced vertical walls of said at least one top tube and said at least one down tube are able to exponentially increase a support strength of a resistance to said bending;
   wherein said at least one top tube of said bike frame assembly further comprises a positive arch, said positive arch providing increased mechanical strength against said bending and a cracking of said bike frame assembly;
   wherein said end A of said at least one top tube is non-removably attached to said sidewall A of said at least one head tube, an attachment angle between said at least one top tube and said at least one head tube comprising about a 20 degree rake angle;
   wherein said end B of said at least one top tube is non-removably attached to a side wall of said at least one seat tube near end E at about a 90 degree angle;
   wherein said end A and said end B of said at least one top tube have a width about half of said width of a middle portion of said at least one top tube;
   wherein said bike frame assembly comprises a bottle opener gusset that non-removably attaches a first edge of said bottle opener gusset to an underside of said at least one top tube that is planate with said end E, and attaches a perpendicular facing second edge of said bottle opener gusset to said at least one seat tube adjacent to said underside of said at least one top tube;
   wherein said bottle opener gusset increases a rigidity of said bike frame assembly;
   wherein said bottle opener gusset further strengthens a bond between said at least one top tube and said at least one seat tube thereby reducing susceptibility to a shock damage and to a metal fatigue failure;
   wherein said end C of said at least one down tube is non-removably attached to said sidewall A of said at least one head tube below an attachment point of said end A of said at least one top tube such that said at least one down tube and said at least one top tube are vertically planar;
   wherein said end D of said at least one down tube is perpendicularly and non-removably attached to a sidewall of said at least one bottom bracket housing, said at least one bottom bracket housing comprising a horizontally positioned cylindrical tube;
   wherein said end F of said at least one seat tube is non-removably attached to said sidewall of said at least one bottom bracket housing at about a 90 degree angle to said end D of said at least one down tube;
   wherein said end G of said at least one seat-stay left is non-removably attached to a left side of said at least one top tube near said end B and comprises an off-set extending substantially parallel planar to said at least one top tube;
   wherein said end H of said at least one seat-stay left is attached to said end N of said at least one chain-stay left via said at least one rear drop-out left, said at least one chain-stay cap left, and said at least one seat-stay cap left;
   wherein said end M of said at least one chain-stay left is non-removably attached to said at least one bottom bracket housing such that said at least one seat-stay left, said at least one chain-stay left, and said at least one seat tube substantially form a triangular profile shape;
   wherein said end I of said at least one seat-stay right is non-removably attached to a right side of said at least one top tube near said end B and comprises an off-set extending substantially and horizontally parallel planar to said at least one top tube and horizontally parallel planar to said seat-stay left;
   wherein said end J of said at least one seat-stay right is attached to said end P of said at least one chain-stay right via said at least one rear drop-out right, said at least one chain-stay cap right, and said at least one seat-stay cap right;

wherein said end O of said at least one chain-stay right is non-removably attached to said at least one bottom bracket housing such that said at least one seat-stay right, said at least one chain-stay right, and said at least one seat tube substantially form a triangular profile shape;

wherein said at least one bottom bracket housing comprises a connection point for said end D, said end F, said end M, and said end O of said at least one down tube, said at least one seat tube, said at least one chain-stay left and said at least one chain-stay right respectively;

wherein said end L of said at least one seat-stay crossbar is non-removably attached to an inner side of said at least one seat-stay left and said end K is non-removably attached to an inner side of said at least one seat-stay right such that said at least one seat-stay crossbar forms an upper spreader brace;

wherein said at least one kickstand mount is non-removably attached to a bottom side of said at least one chain-stay left near said end M and to an underside of said at least one chain-stay right near said end O;

wherein said end Q of said at least one chain-stay crossbar is non-removably attached to an inner side of said at least one chain-stay left and said end R is non-removably attached to an inner side of said at least one chain-stay right such that said at least one chain-stay crossbar forms a lower spreader brace;

wherein said at least one chain-stay right and said at least one chain-stay left and said at least one seat-stay right and said at least one seat-stay left each comprise an elongated elliptical cross-section that is able to substantially increase a resistance to said metal fatigue and a frame failure;

wherein said steering assembly is structured and arranged to pivotally couple to said at least one head tube such that a fully assembled said bike frame assembly is able to be steered during a forward movement;

wherein said steering assembly further comprises a fork-blade right and a fork-blade left;

wherein said fork-blade left and said fork-blade right of said steering assembly further comprise a front drop-out left and a front drop-out right respectively;

wherein said front drop-out left and said front drop-out right are structured and arranged such that a front bicycle wheel is able to be rotatably coupled thereto, and said rear drop-out left and said rear drop-out right is structured and arranged such that a rear bicycle wheel is able to be rotatably coupled thereto;

wherein said bike frame assembly further comprises a greater distance between a front wheel axis and a rear wheel axis than a standard bicycle frame providing a greater forward movement stability;

wherein said fork-blade right and said fork-blade left each comprise an elongated elliptical cross-section to resist bending from a frontal impact; and wherein said bike frame assembly having said concave-tubular frame design is useful for increasing a stress induced crack resistance and a bend resistance of said bike frame assembly for a longer service life of said bike frame assembly.

19. The inverted tube bike frame with bottle opener gusset system of claim 18 further comprising a kit including:
at least one fully assembled said frame sub-assembly;
at least one fully assembled said fork sub-assembly;
at least two said bicycle wheels;
at least one bicycle chain;
at least one pedal assembly;
at least one set of wheel brakes and at least one handlebar brake lever;
at least one set of handle bars having vertically formed handgrips;
at least one set of assembly instructions; and
at least one owner's manual.

20. A method of producing an inverted tube bike frame with bottle opener gusset system comprising the steps of:
extruding and forming a top tube and a down tube having concave sidewalls;
extruding and forming elliptical profile tubes for a fork-blade right and a fork-blade left, a chain-stay left and a chain-stay right, a seat-stay left and a seat stay right, a chain-stay crossbar, and a seat-stay crossbar;
stamp-cutting a rear dropout-left, a rear dropout-right, a front dropout-left, a front dropout-right, a kickstand mount, and a bottle opener gusset;
extruding and forming circular profile tubes for a bottom bracket housing, a fork crown, a steering tube, a head tube, and a seat tube;
attaching said top tube to said head tube and seat tube;
attaching said down tube to said head tube and to said bottom bracket housing, and attaching said bottom bracket housing to an end F of said seat tube;
attaching said seat-stay left and said seat stay right to said top tube and to said seat-stay crossbar;
attaching said rear dropout-left and said rear dropout-right to said seat-stay left and said seat-stay right respectively;
attaching said chain-stay left and said chain-stay right to said seat-stay left and seat-stay right respectively and said chain-stay left and said chain-stay right to said bottom bracket housing;
attaching said chain-stay crossbar to said chain-stay left and said chain-stay right;
attaching said bottle opener gusset to said top tube and said seat tube to form a frame sub-assembly;
attaching said fork-blade right and said fork-blade left to said fork crown and said steering tube to form a steering sub-assembly; and
attaching said steering sub-assembly to said head tube of said frame sub-assembly to complete a bike frame assembly.

* * * * *